United States Patent [19]

Fraser

[11] 3,726,487
[45] Apr. 10, 1973

[54] HOMOGENIZER SHEARING ASSEMBLY APPARATUS AND PROCESS
[75] Inventor: Douglas S. Fraser, New Paltz, N.Y.
[73] Assignee: Cenco Medical/Health Supply Corporation, Chicago, Ill.
[22] Filed: Apr. 5, 1971
[21] Appl. No.: 130,906

[52] U.S. Cl. ............... 241/46.17, 241/294, 241/298
[51] Int. Cl. ............................................. B02c 18/10
[58] Field of Search .................... 241/46, 46.17, 277, 241/294, 298, 185 R, 188 R; 146/68 R, 68 A

[56] References Cited

UNITED STATES PATENTS

| 3,493,022 | 2/1970 | Mantelet | 146/68 R |
| 443,522 | 12/1890 | Hughes | 241/277 X |
| 2,464,588 | 3/1949 | Knudsen et al. | 241/46.17 |
| 2,710,035 | 6/1955 | Plummer | 146/68 R X |
| 3,510,067 | 5/1970 | Beck et al. | 241/185 R X |

Primary Examiner—Granville Y. Custer, Jr.
Attorney—Robert E. Wagner

[57] ABSTRACT

A tissue shearing assembly for use in a homogenizing apparatus having shearing means disposed along the chords or diameter of annular support means and fixed to the support means so that a portion of the shearing means extends marginally beyond the periphery of the support means. A plurality of similar annular support means containing shearing means disposed similarly on each, stacked in vertical relationship and mounted on a spindle connected to a homogenizer motor for rotation about an axis at high speed, the annular support means rotating with the spindle about the same axis and the shearing means thereby traveling in a path spaced from the same axis. An annular support means containing shearing means and having a diameter such that the circumference of the annular support means is greater than the length of the longest tissue to be homogenized.

8 Claims, 4 Drawing Figures

INVENTOR
DOUGLAS S. FRASER
BY Robert E. Wagner
ATT'Y

HOMOGENIZER SHEARING ASSEMBLY APPARATUS AND PROCESS

BACKGROUND OF THE INVENTION

This invention relates to apparatus for homogenizing tough or stringy tissue as is necessary for ultra-fine emulsification, tissue cell disruption and bacterial disintegration in laboratory procedures. More particularly, this invention relates to the shearing assembly component of a conventional homogenizing apparatus with which the cutting of such tissues is actually accomplished.

In a conventional homogenizing apparatus, the shearing assembly is mounted on the homogenizer spindle which is in turn connected to the homogenizer motor. The homogenizer motor imparts an extremely fast rotation to the spindle, causing it to rotate about a central axis at speeds of up to 60,000 rpm. The shearing assembly, being mounted on the homogenizer spindle, also rotates with this spindle about this axis, theoretically causing any tissue, such as bovine tendon tissue, cartilage, plant tissues or oak seedlings, which are placed in contact with it to be emulsified or cut into ultra-fine particles, thereby releasing intercellular constituents due to the extremely high cutting speeds.

In the past, two principal types of shearing assemblies have been used, namely, a blade assembly and a glass bead assembly. Each of these accomplished the release of intercellular constituents from tissues during homogenization and each had its own particular advantages. However, the major disadvantage of the blade-type assembly was that the tough, stringy tissues to be homogenized had a tendency to wrap themselves around the homogenizer spindle, thus destroying the ability of the homogenizer to perform complete homogenization. In addition, the build-up of tissue around the spindle caused a severe drag on the motor of the homogenizer, reducing the possible revolutions per minute and, thus, increasing the time required for homogenization, causing excessive heat build-up within the sample and destruction of some cells during homogenization. To eliminate these problems as much as possible, tough tissues to be homogenized in present homogenizers have had to be prepared by mincing, freezing or cutting before actual homogenization to insure complete homogenization.

DESCRIPTION OF THE INVENTION

The shearing assembly apparatus of this invention eliminates this incomplete homogenization, tissue wrap and excessive heat build-up without requiring any tissue preparation. This shearing assembly achieves complete homogenization of unprepared tissue quickly and with a minimum of heat buildup by an annular support means or disc means, or a series of annular support means or disc means stacked in a vertical relationship and mounted on a conventional homogenizer spindle, each support means having shearing means or blades fixed thereto and disposed along chords or a diameter thereof, a portion of which extend beyond the periphery of the annular support means. Each annular support means has a minimum diameter such that its circumference is at least equal to the length of the longest tissue to be homogenized. Since the annular support means containing the blades are mounted on the homogenizer spindle, they rotate with the spindle about the same axis as the spindle. The portion of the blade extending beyond the periphery of the support means serves as a cutting edge and travels along a path spaced from this axis during rotation of the support means.

This novel shearing assembly effectively eliminates tissue wrap around the homogenizer spindle because the effective circumference or peripheral dimension of the spindle is made greater than the longest length of tissue to be homogenized by the fact that the annular support means or discs provide the spindle with a much greater effective diameter than it actually has. Thus, the effective circumference of the spindle is such that it will be impossible for tissues to wrap themselves around the spindle. In addition, the fact that each disc has at least two cutting faces provided by the blades fixed thereto and extending beyond the periphery thereof means that in an embodiment of the shearing assembly having a series of discs stacked one on top of another containing such blades, the number of cutting surfaces which act to shear the tissue in the homogenizer may be made greater than in present homogenizers and, thus, homogenization may be accomplished more efficiently, more quickly, more completely, and with less heat build-up. The combination of the large diameter and multiplicity of the cutting surfaces has the effect of multiplying the base homogenizer speed, thereby reducing homogenization time significantly and keeping heat build-up to a minimum.

Finally, since tissue wrap is eliminated, drag pn the homogenizer motor is significantly decreased, thereby cancelling this factor contributing to heat build-up.

Accordingly, it is an object of this invention to provide a shearing assembly apparatus for the complete homogenization of tough, stringy tissue without any prior preparation of such tissue.

It is a further object of this invention to provide an apparatus which will eliminate the wrapping of tissue around the spindle of the homogenizer during homogenization.

It is another object of this invention to provide an apparatus in which more cutting surfaces are available to accomplish more complete, more efficient, and faster homogenization of tissue.

It is a still further object of this invention to provide an apparatus which will eliminate excessive heat build-up caused by tissue wrap and inefficient cutting methods in present homogenization apparatus.

It is also an object of this invention to provide a shearing assembly apparatus useful in connection with a conventional homogenizer motor and spindle, and having a number of cutting surfaces which may be varied according to the requirement of the particular tissue to be homogenized.

It is an additional object of this invention to provide a process for the construction of a shearing assembly having shearing means embedded in annular support means.

These and other important objects of this invention will become apparent in the following description taken in conjunction with the drawings illustrating a preferred embodiment wherein.

Figure 1:
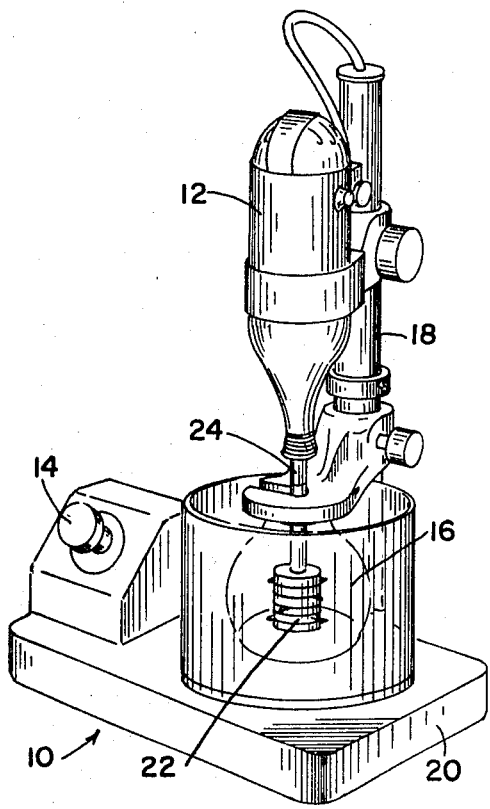
FIG. 1 is an isometric view of a complete homogenizer unit having the shearing assembly of this invention mounted thereon.

Referring specifically to FIG. 1, the shearing assembly apparatus is shown in relationship to a standard commercial tissue homogenizer unit 10 comprising a homogenizer motor 12 mounted on a support standard 18 which is fixed to a homogenizer unit base 20. The homogenizer motor 12 is directly connected to a homogenizer spindle 24 which is caused to rotate about a central axis by the action of the homogenizer motor 12. The homogenizer motor 12 is capable of rotating the homogenizer spindle 24 at speeds of up to 60,000 rpm, various speeds of rotation being set by use of a motor control 14 attached to the homogenizer unit base 20. Mounted on the lower portion of said homogenizer spindle as shown in FIG. 1 is the shearing assembly apparatus 22 as disclosed herein. The lower portion of the spindle 24 and the entire shearing assembly apparatus 22 are enclosed in a homogenizing flask 16 which is shaped in such a manner that it contains the tissues to be homogenized and the homogenized product within a definitely defined volume during homogenization.

Figure 2:
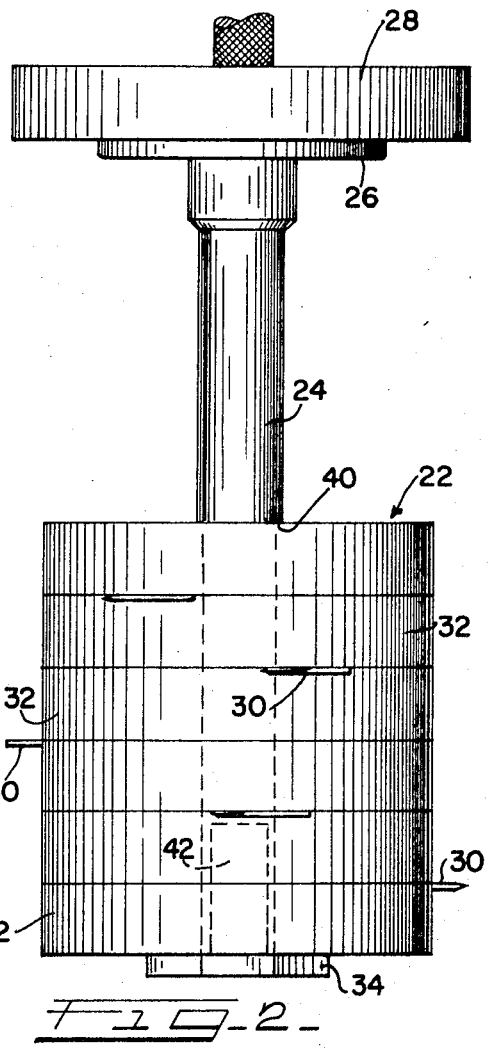
FIG. 2 is an elevational view of the shearing assembly shown as mounted on a homogenizer spindle.

The shearing assembly apparatus 22 of this invention is shown in more detail in FIG. 2. Shearing assembly apparatus 22 is mounted on the lower portion of homogenizer spindle 24 for rotation with the spindle 24 about its central axis. The homogenizer spindle 24 has at its upper portion a spindle cap 26 mounted beneath a baffle 28 which serves to keep the homogenate within the homogenizing flask 16 during the process of homogenization.

The shearing assembly 22, as shown in FIG. 2, includes a series of individual annular support means or discs 32 which may be mounted on the homogenizer spindle 24 singly or stacked one on top of another in vertical relationship and mounted on the spindle 24 in the manner shown in FIG. 2. The variable number of annular support means 32 desired to compose the shearing assembly 22 are supported on the spindle 24 from below by a bottom plate 34.

Figure 3:
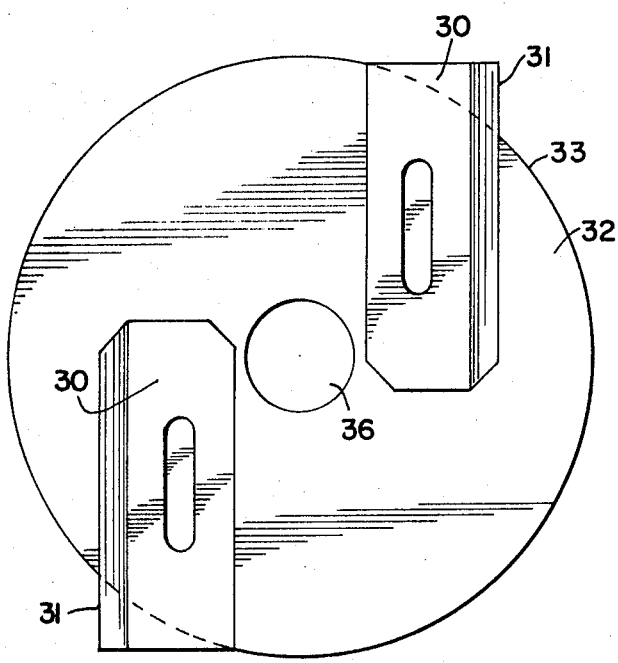
FIG. 3 is a plan view of an annular support means of this shearing assembly apparatus.

The annular support means or discs 32 each contain at least one shearing means or blade 30 fixed to its top surface in such a manner that a portion 31 of the blade 30 projects marginally beyond the periphery 33 of the annular support means 32 as shown in FIG. 3.

For the purpose of the present application, "marginally," as used in this specification, shall be taken to mean extending slightly beyond the periphery of the annular support means or disc 32 to prevent wrapping of tissue about the projecting portion 31 of the blade 30 during the homogenization process. The projecting portion 31 of the blade 30 which extends beyond the periphery 33 of the annular support means 32 is preferably triangular in shape and provides a cutting surface which travels about the central axis of the homogenizer spindle 24 in a path that is effectively tangential to the periphery 33 of the annular support means 32, such a path resulting in the most effective cutting action.

In the preferred embodiment shown in FIG. 3, the shearing means 30 are disposed on either side of the center hole 36 of the annular support means 32 through which the homogenizer spindle 24 is inserted. The shearing means or blades 30 are disposed along chords of the annular support means 32 which are spaced from the center hole 36 and, therefore, the spindle 24. The shearing means or blades 30 may be fashioned by cutting a conventional injector razor blade in half, the cut edge being positioned near the periphery 33 of the annular support means 32.

Figure 4:
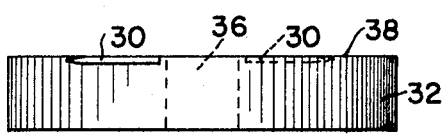
FIG. 4 is a vertical elevational view of an annular support means of this shearing assembly apparatus.

In FIG. 4, a single annular support means 32 is shown having shearing means or blades 30 disposed thereon. These shearing means 30 are shown in spaced relationship from center hole 36.

An annular support means 32 such as that shown in FIG. 4 with blades 30 disposed thereon may be placed on homogenizer spindle 24 by sliding the spindle 24 through the center hole 36 of the support means 32.

The blades 30 may be disposed along a diameter of annular support means 32 or along more than two chords of annular support means 32, provided that annular support means 32 is kept in balanced relationship on opposite sides of the center hole 36, i.e., the center of gravity of the support means 32 must be maintained at a point substantially that through which the central axis of the spindle 24 passes so that rotation of the shearing assembly 22 at high speed is not adversely affected.

The shearing means or blades 30 are affixed onto each annular support means 32 by embedding these blades 30 having holes in their centers in the top surface 38 of the annular support means 32 as shown in FIG. 4 Annular support means 32 may be formed of any suitable thermoplastic material, examples of which are listed on page 11, infra. The preferable procedure for embedding the blades involves the simultaneous application of heat at 200°C to 210°C and pressure at approximately 148 psi to the blades 30 on the annular support means 32 for a time period of approximately 50 seconds. When the pressure and heat are released, the flashing is trimmed from the center hole 36 with a punch and the shearing assembly 22 is then stress relieved at an elevated temperature ranging from approximately 121°C to 127°C for approximately 2 hours. The shearing assembly 22 is then cooled overnight in an oven.

In the operation of the shearing assembly 22 in connection with the tissue homogenizer unit 10, an annular support means or disc 32 having no shearing means 30 affixed thereto is first positioned on the homogenizer spindle 24 by having the spindle 24 inserted through its center hole 36. It is then slid in an upward direction along the spindle 24. Next, one or more annular support means 32 containing shearing means 30, depending upon the number of cutting surfaces desired to be used in the homogenization procedure, are slid in like manner over the homogenizer spindle 24. The number of cutting surfaces desirable and, thus, the number of annular support means 32 having shearing means 30 disposed thereon to be used will depend upon the type and characteristics of tissue or material to be homogenized and the time within which complete homogenization is desired to be accomplished. When the desired number of annular support means 32 and spacers have been mounted on the homogenizer spindle 24 in abutment with the shoulder 40, a screw 42 is threaded into the bottom end of the spindle 24 so that its head which forms the bottom plate 34 maintains the stack of annular support means 32 and any spaces used against the shoulder 40 on the spindle 24. The faces of all the annular support means 32 in the stack are adjacent and contiguous to hold the cutting blades locked in place.

The tightness and compactness of the stack and the fact that the center hole 36 of the annular support means 32 is of only slightly larger diameter than the diameter of the homogenizer spindle 24 serves to hold each annular support means 32 and the entire stack of annular support means 32 in fixed relationship to the homogenizer spindle 24 during rotation of the spindle 24 assuring vibration free rotation.

The use of a similar annular support means 32 having no shearing means 30 as a top plate and the fact the bottom of each succeeding support means 32 in the stack rests upon the top face of the next succeeding support means 32 prevents the shearing means or blades 30 embedded in the top of each support means 32 from popping during rotation due to the tremendous forces imparted on each shearing means 30 by rotation and cutting.

When the shearing assembly 22 has been properly mounted on the homogenizer spindle 24, it may be inserted in the homogenizer flask 16. The apparatus is then ready to carry out complete, efficient and quick homogenization on any material introduced into the flask 16.

When the shearing assembly apparatus 22 is used in a homogenization operation, the diameter of the annular support means or discs 32 is such that the long fibrous tissue which must be cut during homogenization will not become wound around the shaft but will remain in the path of the shearing means 30 so that it will be emulsified or chopped up. In addition, since each shearing means or blade 30 is preferably positioned along a chord of the annular support means 32 which is spaced from the central axis about which the support means 32 rotates, the path in which the cutting surface of the blade 30 travels is also spaced from this axis. Upon rotation, therefore, the cutting surface effectively moves tangentially to the disc 30, thereby improving the cutting action and avoiding the wrapping of the tissue fiber.

The support means or discs 32 may be constructed of any suitable non-toxic and autoclavable material which is easily formed into a disc shape, such as a polycarbonate. Other thermoplastic materials such as polypropylene have been used successfully and materials such as those sold under the names and trademarks nylon, ABS, acrylics, TEFLON and KEL-F would be suitable. The blade means 30 may also be formed of any non-toxic and auto-clavable material of extremely high strength such as steel or a steel alloy which is capable of being machined along at least one edge to provide an exceedingly sharp cutting surface. The blade means 30 preferably used in the shearing assembly 22 are ordinary injector razor blades which have been cut in half so that the halves may be disposed along chords on opposite sides of the center hole 36 of each annular support means 32.

While this invention has been described in relation to a preferred embodiment thereof, it will be apparent to those skilled in the art that the structural details are capable of wide variation without departing from the principles of the invention.

I claim:

1. In a homogenizing apparatus including a motor means capable of attaining high speeds of rotation effective to homogenize and emulsify tissue, the improvement comprising a shearing assembly particularly adapted for use in said homogenizing apparatus, said shearing assembly having annular support means having a minimum peripheral dimension at least equal to the length of the longest tissue to be sheared, shearing means carried by said annular support means and extending marginally beyond the periphery of said support means, said annular support means including disc means mounted on a spindle which is disposed for rotation about an axis, said spindle being rotated about said axis by said motor means, said shearing means being disposed along chords or a diameter of said disc means, said shearing means having a cutting portion extending marginally beyond the periphery of said support means and travelling in a circular path spaced from said axis upon rotation of said spindle about said axis such that said shearing assembly emulsifies tissue while precluding wrapping of said tissue therearound.

2. In a shearing assembly particularly adapted for use in a homogenizing apparatus or the like, the improvement including shearing means carried by annular support means and extending marginally beyond the periphery of said support means, said annular support means including a series of disc means, each of said disc means having a minimum peripheral dimension at least equal to the length of the longest tissue to be sheared, each of said disc means having said shearing means disposed along chords or a diameter thereof, each disc means being mounted on said spindle disposed for rotation about said axis, each disc means being mounted for rotation with said spindle about said axis, said series of disc means being stacked in adjacent vertical relationship on said spindle, to effectively space and hold said shearing means to form said shearing assembly, said shearing means having a cutting portion extending marginally beyond the periphery of said support means and travelling in a circular path spaced from said axis for emulsification of tissue while precluding wrapping of said tissue on said shearing assembly.

3. In combination with a homogenizing unit having high speed motor means attaining speeds of up to about 60,000 revolutions per minute, said motor means having a spindle connected thereto, a shearing assembly for use in completely homogenizing extremely tough or stringy tissue without excessive heat build up while precluding wrapping of said tissue around said assembly, said shearing assembly including shearing means carried by annular support means and extending marginally beyond the periphery of said support means, said annular support means including a series of disc means, at least two of said disc means having shearing means disposed along chords or diameters thereof and carried thereby, said disc means being mounted on a spindle disposed for rotation about an axis, said disc means being mounted for rotation with said spindle about said axis, the marginally extending portion of said shearing means thereby travelling in a path spaced from said axis.

4. In a homogenizing apparatus including high speed motor means attaining speeds of up to about 60,000 revolutions per minute, said motor means having a spindle for mounting a shearing assembly thereon, for use in completely homogenizing extremely tough or stringy tissue without excessive heat build up while precluding wrapping of said tissue around said assembly, the improvement comprising, shearing means carried on annular support means and extending marginally beyond the periphery of said support means, said annular support means having a peripheral dimension greater than the dimension of the longest tissue to be sheared to preclude wrapping of said tissue on said support means, said support means being mounted on said spindle disposed for rotation about an axis, said support means being mounted for rotation with said spindle about said axis, the marginally extending portion of said shearing means thereby travelling in a path spaced from said axis for emulsification of said tissue.

5. In a homogenizing apparatus including high speed motor means capable of attaining speeds of up to about 60,000 revolutions per minute, said motor means having a spindle for mounting a shearing assembly thereon, the improvement comprising, shearing means carried on annular support means and extending marginally beyond the periphery of said support means, said annular support means including a series of disc means, each of said disc means having a minimum peripheral dimension at least equal to the length of the longest tissue to be sheared, at least two of said disc means having shearing means carried thereon and disposed along chords or a diameter thereof, each of said disc means being mounted on said spindle disposed for rotation about an axis, each of said disc means being mounted for rotation with said spindle about said axis, said disc means being stacked in adjacent vertical relationship upon said spindle and being maintained in fixed relationship to said spindle during the rotation of said spindle about said axis.

6. The improvement defined in claim 4 wherein said shearing means comprises blade means disposed along chords or a diameter of said annular support means, a portion of said blade means extending marginally beyond the periphery of said support means and acting as a cutting surface for the emulsification of said tissue.

7. The improvement defined in claim 4 wherein aid shearing means carried on said annular support means comprises blade means having at least one sharpened cutting surface and having a hole near its center which is embedded in a surface of said annular support means.

8. A shearing assembly particularly adapted for use in a homogenizing apparatus or the like, including disc means having a peripheral dimension greater than the length of the longest tissue to be sheared to preclude wrapping of said tissue about said disc means and having a hole disposed at its center for receiving a spindle, said spindle being disposed for rotation about an axis, said disc means being mounted on said spindle for rotation with said spindle about said axis, and including blade means having at least one sharpened cutting surface and having a hole formed near its center which is embedded into a surface of said disc means along chords or a diameter of said disc means in such a manner that a portion of said blade means extends marginally beyond the periphery of said disc means, said portion traveling in a circular path spaced from said axis for emulsification of tissue.

* * * * *